(12) United States Patent
Hirai

(10) Patent No.: US 9,636,575 B2
(45) Date of Patent: May 2, 2017

(54) MOBILE TERMINAL, CONTROL METHOD FOR MOBILE TERMINAL, AND PROGRAM

(71) Applicant: NEILO INC., Tokyo (JP)

(72) Inventor: Takeshi Hirai, Tokyo (JP)

(73) Assignee: NEILO INC., Tokyo (JP)

(*) Notice: Subject to any disclaimer, the term of this patent is extended or adjusted under 35 U.S.C. 154(b) by 0 days.

(21) Appl. No.: 14/894,387

(22) PCT Filed: Aug. 7, 2014

(86) PCT No.: PCT/JP2014/070824
§ 371 (c)(1),
(2) Date: Nov. 27, 2015

(87) PCT Pub. No.: WO2015/114860
PCT Pub. Date: Aug. 6, 2015

(65) Prior Publication Data
US 2016/0107081 A1    Apr. 21, 2016

(30) Foreign Application Priority Data

Jan. 28, 2014 (JP) ................................ 2014-012983

(51) Int. Cl.
| | | |
|---|---|---|
| *A63F 13/422* | (2014.01) | |
| *A63F 13/211* | (2014.01) | |
| *A63F 13/428* | (2014.01) | |
| *A63F 13/92* | (2014.01) | |
| *A63F 13/2145* | (2014.01) | |
| *A63F 13/5255* | (2014.01) | |
| *A63F 13/42* | (2014.01) | |

(52) U.S. Cl.
CPC ........ *A63F 13/211* (2014.09); *A63F 13/2145* (2014.09); *A63F 13/422* (2014.09);
(Continued)

(58) Field of Classification Search
CPC .......... A63F 13/06; A63F 13/20; A63F 13/21; A63F 13/211; A63F 13/22; A63F 13/426;
(Continued)

(56) References Cited

U.S. PATENT DOCUMENTS

| | | | | |
|---|---|---|---|---|
| 2009/0303204 A1* | 12/2009 | Nasiri | .................... | A63F 13/06 345/184 |
| 2011/0134030 A1* | 6/2011 | Cho | .................... | G06F 3/03547 345/157 |
| 2011/0227913 A1* | 9/2011 | Hyndman | ............... | A63F 13/10 345/419 |

FOREIGN PATENT DOCUMENTS

| | | |
|---|---|---|
| JP | 2002-232549 A | 8/2002 |
| JP | 2012-083809 A | 4/2012 |

(Continued)

OTHER PUBLICATIONS

Dec. 30, 2016 Office Action Issued in Korean Patent Application No. 10-2016-7029310.
Gyakuten Saiban 123HD, Apuri Fan, Aug. 10, 2013, vol. 1, No. 4, pp. 116-118.
Kantan Sosa Nagara mo Shikkari Asoberu Sumaho Muke Online RPG 'Klee' Sakuhin no Key Man ni Honsaku no Concept kara Miryoku made Iroiro Kiitemita, [online], 4Gamer.net, Aetas, Inc., May 31, 2014, [Retrieval date Oct. 6, 2014] <URL: <http://www.4gamer.net/games/215/G021515/20140529078/>>.

(Continued)

*Primary Examiner* — Damon Pierce
(74) *Attorney, Agent, or Firm* — Oliff PLC

(57) ABSTRACT

A mobile terminal, a control method for mobile terminal, and a program that make it possible to enjoy a game even in a situation in which only one hand can be used. A mobile terminal according to the invention is a mobile terminal used in a game. The mobile terminal according to the invention includes a detection unit configured to detect an orientation of the mobile terminal and a control unit configured to change over a manipulation mode of a game depending upon the orientation of the mobile terminal detected by the detection unit.

10 Claims, 5 Drawing Sheets

(52) U.S. Cl.
CPC ........ *A63F 13/428* (2014.09); *A63F 13/5255* (2014.09); *A63F 13/92* (2014.09); *A63F 13/42* (2014.09)

(58) Field of Classification Search
CPC .................. A63F 13/92; A63F 2300/10; A63F 2300/1006; A63F 2300/105; A63F 2300/1018; A63F 13/42; A63F 13/422; A63F 13/428; A63F 2300/6045; A63F 2300/6054
See application file for complete search history.

(56) References Cited

FOREIGN PATENT DOCUMENTS

| | | |
|---|---|---|
| JP | 2012-253716 A | 12/2012 |
| JP | 2013-244050 A | 12/2013 |

OTHER PUBLICATIONS

Oct. 28, 2014 International Search Report issued in International Patent Application No. PCT/JP2014/070824.
Oct. 14, 2014 Office Action issued in Japanese Patent Application No. 2014-012983.
Dec. 2, 2014 Decision of Patent Grant issued in Japanese Patent Application No. 2014-012983.

\* cited by examiner

MOBILE TERMINAL, CONTROL METHOD FOR MOBILE TERMINAL, AND PROGRAM

TECHNICAL FIELD

The present invention relates to a mobile terminal, a control method for mobile terminal, and a program that are used for a game.

BACKGROUND ART

In recent years, mobile terminals such as smart phones and tablets have been spread. In these mobile terminals, it is possible to download games or the like. Furthermore, various kinds of mobile game terminals have been spread. Therefore, persons enjoying games not only indoors but also in a visiting place are increasing.

However, the conventional mobile terminal is premised on manipulation with both hands. For example, in a state in which the mobile terminal is oriented laterally, a cross key is manipulated with a left hand and a depression button is manipulated with a right hand. In a case where one hand is full in a train, for example, to have a bag or hold on to a strap, it is impossible to enjoy a game in some cases.

PRIOR ART REFERENCES

Patent Documents

Patent Document 1: JP 2012-083809 A

SUMMARY OF THE INVENTION

Problems to be Solved by the Invention

The present invention has been made to cope with the above-described circumstances. An object of the present invention is to provide a mobile terminal, a control method for mobile terminal, and a program making it possible to enjoy a game even in a situation in which one hand cannot be used.

Means for Solving the Problems

In order to achieve the above-described object, according to the present invention, a mobile terminal is used in a game, and the mobile terminal includes a detection unit configured to detect an orientation of the mobile terminal, and a control unit configured to change over a manipulation mode of the game depending upon the orientation of the mobile terminal detected by the detection unit.

Advantageous Effects of Invention

According to the present invention, a detection unit configured to detect an orientation of a mobile terminal and a control unit configured to change over a manipulation mode of a game depending upon the orientation of the mobile terminal detected by the detection unit, as described heretofore. Even in a situation in which only one hand can be used, therefore, it is possible to enjoy a game, resulting in improved convenience to the user.

DESCRIPTION OF EMBODIMENTS

Hereafter, embodiments of the present invention will be described in detail with reference to the drawings.

Embodiment

Figure 1:
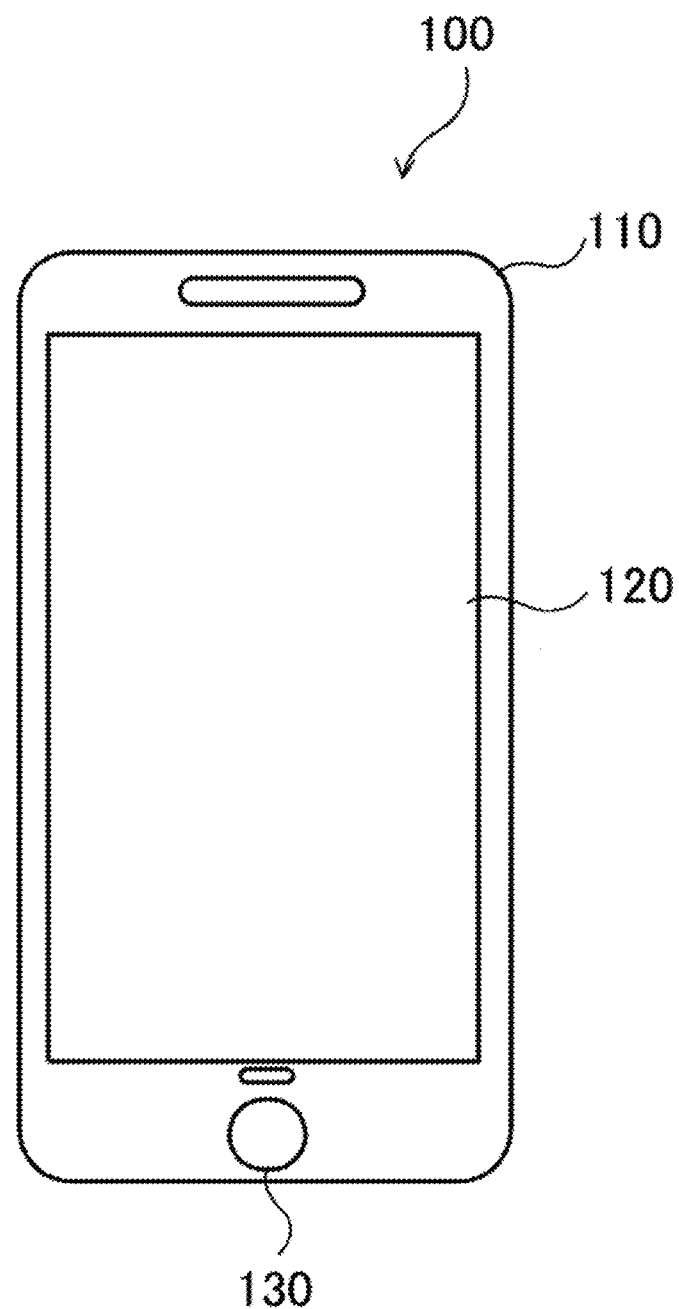
FIG. 1 illustrates a plan view of a mobile terminal according to an embodiment.

FIG. 1 is an exterior view of a mobile terminal 100 according to an embodiment. The mobile terminal 100 is a mobile terminal, such as, for example, a smartphone, a tablet PC, or a game terminal. In FIG. 1, a smartphone is illustrated as the mobile terminal 100 according to the embodiment. Hereafter, the mobile terminal 100 according to the embodiment will be described by taking the smartphone as an example. However, the present invention can be applied to mobile terminals other than the smartphone.

In the mobile terminal 100, a display device 120 and a manipulation button 130 are provided in a casing 110 taking a longitudinally long rectangular shape as illustrated in FIG. 1. The casing 110 is formed of a material such as resin or metal. The display device 120 takes a longitudinally long rectangular shape. The display device 120 is the so-called touch panel obtained by combining a display device such as a liquid crystal panel with a location input device such as a touch pad. The display device 120 takes a longitudinally long rectangular shape. Icons and so forth required to manipulate the mobile terminal 100 are displayed on the display device 120. A user can manipulate the mobile terminal 100 by touching the display device 120. The manipulation button 130 accepts a manipulation input of the user such as ON/OFF of a power supply.

Figure 2:
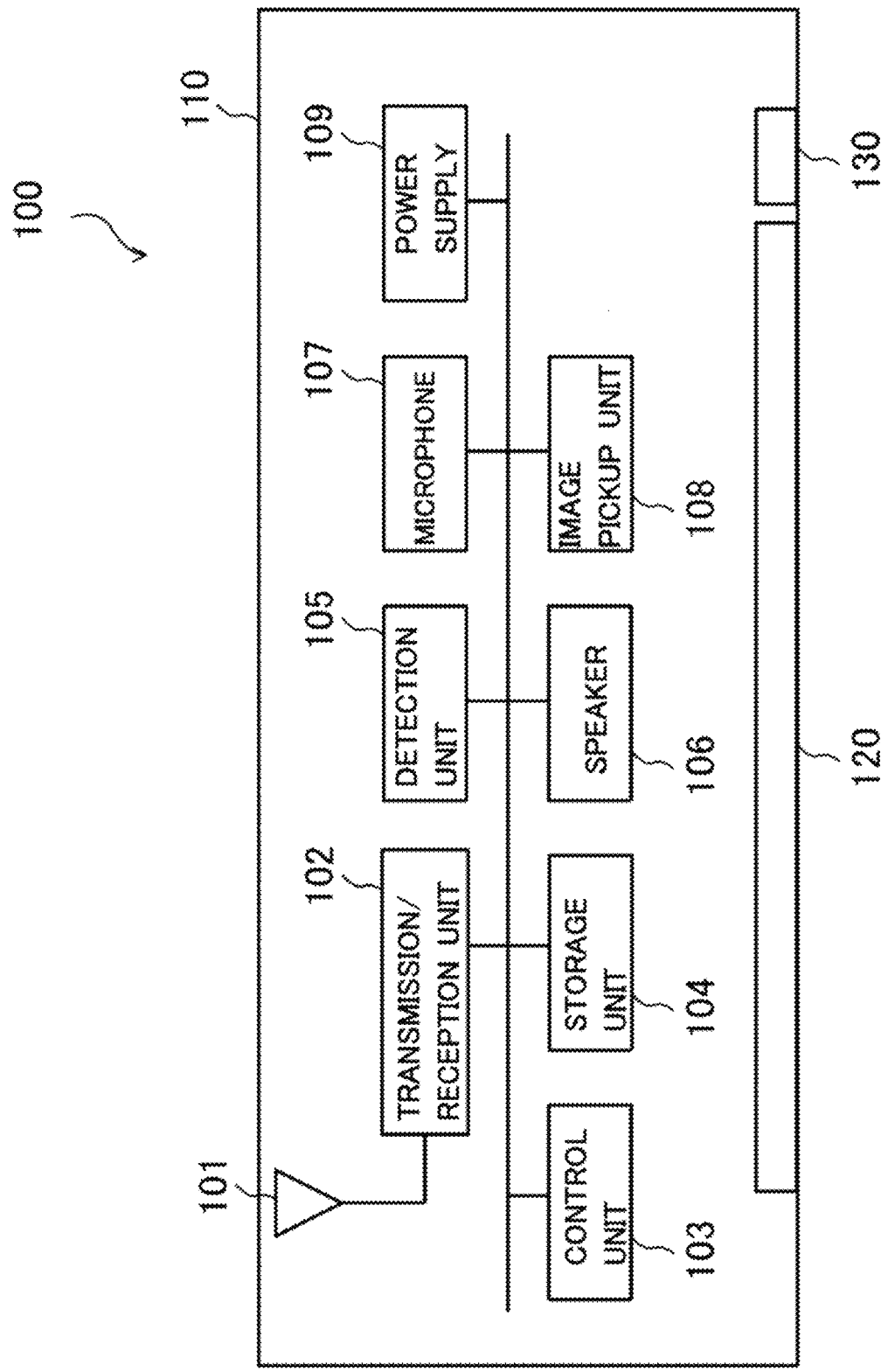
FIG. 2 is an internal configuration diagram of the mobile terminal according to the embodiment.

FIG. 2 is an internal configuration diagram of the mobile terminal 100. Configurations required to function as a smartphone, such as an antenna 101, a transmission/reception unit 102, a control unit 103, a storage unit 104, a detection unit 105, a speaker 106, a microphone 107, an image pickup unit 108, and a power supply 109 are accommodated in the casing 110 in the mobile terminal 100.

The transmission/reception unit 102 inverse-codes a signal (hereafter referred to as data) received by the antenna 101, as occasion demands and then outputs a result to the control unit 103. Furthermore, the transmission/reception unit 102 encodes data input from the control unit 103, as occasion demands and then transmits a result via the antenna 101.

The control unit 103 is a processor such as a CPU (Central Processing Unit). The control unit 103 controls the entire mobile terminal 100 in response to an instruction signal input from the manipulation button 130 and the display device 120. Furthermore, the control unit 103 stores data received by the transmission/reception unit 102 via the antenna 101, into the storage unit 104. In addition, in a case where data received by the transmission/reception unit 102 via the antenna 101 is voice data, the control unit 103 outputs the voice to the speaker 106. Changeover of the manipulation mode of the mobile terminal 100 conducted by the control unit 103 will be described later.

The storage unit 104 is a rewritable storage device, such as, for example, an SSD (Solid State Drive) or an HDD (Hard Disk Drive). The storage unit 104 executes data storage or data reading in response to an instruction from the control unit 103. Furthermore, a program required for operation of the mobile terminal 100 and preinstalled or downloaded game programs are stored in the storage unit 104. Furthermore, manipulation modes (first and second manipulation modes) of the mobile terminal 100 are stored in the storage unit 104.

(First Manipulation Mode)

Figure 3A:
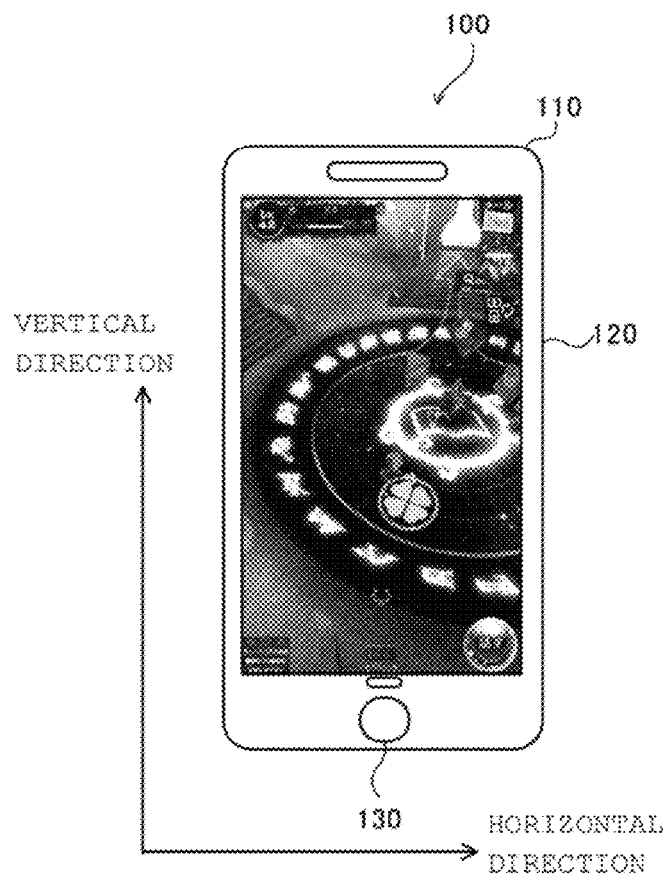
FIG. 3A is a diagram illustrating a display example (longitudinal orientation) of the mobile terminal according to the embodiment.

The first manipulation mode is a mode for causing a game to be manipulated automatically or semi-automatically (hereafter automatically and semi-automatically is referred to collectively as "automatically"). The first manipulation mode is a mode used in a case where one hand is full in a train, for example, to have a bag or hold on to a strap. In a case where the mobile terminal 100 is longitudinally oriented, the mobile terminal 100 is set to the first manipulation mode. FIG. 3A is a diagram illustrating a display example in the first mode, i.e., in a case where the mobile terminal 100 is longitudinally oriented. For reference, the vertical direction and the horizontal direction are illustrated in FIG. 3A.

In the first manipulation mode, the user can specify a location on the display device 120 by touching (tapping) the display device 120 and play a game by conducting a manipulation of flicking the display device 120. For example, in a case where an RPG (Bole Playing Game) is played, a first character in the game moves as far as a location specified by the user, and performs an action automatically depending upon a situation.

Specifically, in a case where there is a second character in the location specified by the user, the first character starts conversation or a battle with the second character automatically. Even after the battle is started, the battle is continued automatically. In addition, in a case where there is an item (including a hidden item) in the specified location, the item is acquired automatically. Furthermore, in a case where the display device 120 is flicked, a viewpoint of a game (orientation of a camera in a virtual space) is changed.

(Second Manipulation Mode)

Figure 3B:
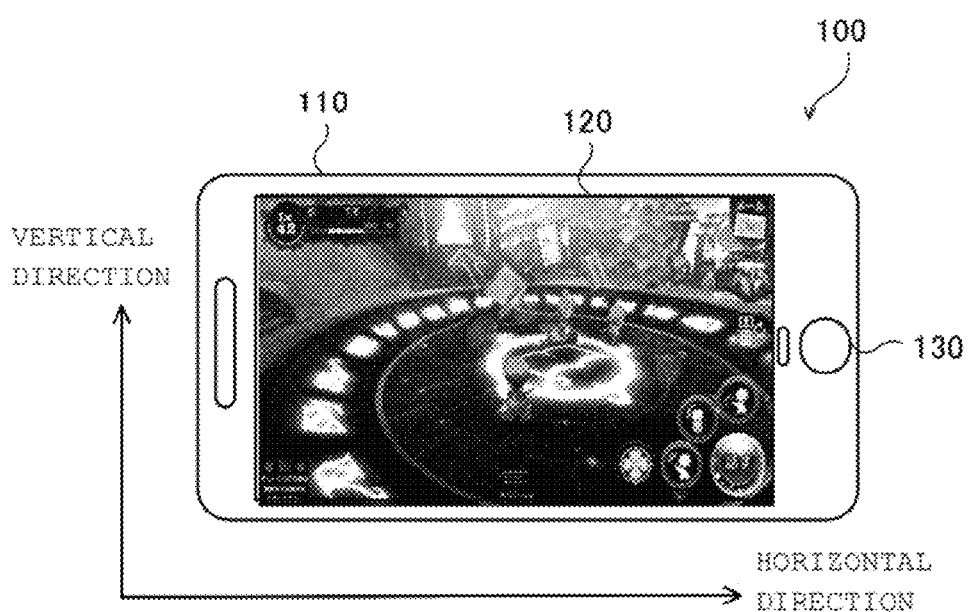
FIG. 3B is a diagram illustrating a display example (lateral orientation) of the mobile terminal according to the embodiment.

A second manipulation mode is a mode for causing a game to be manipulated manually. The second manipulation mode is a mode used in a case where both hands can be used. In a case where the mobile terminal 100 is laterally oriented, the mobile terminal 100 is set to the second manipulation mode. FIG. 3B is a diagram illustrating a display example in the second mode, i.e., in a case where the mobile terminal 100 is laterally oriented. For reference, the vertical direction and the horizontal direction are illustrated in FIG. 3B.

In the second manipulation mode, the user can manipulate a manipulation key displayed on the display device 120 with both hands and play a game. For example, in a case where an RPG is played, the user can move a character in the game by operating the cross key or the like with a left hand, and can cause the character to execute an action depending upon a viewpoint of the game (orientation of a camera in a virtual space) and a situation with a right hand. For example, in a case where an enemy character is displayed, the user moves the character to a location of the enemy character with the left hand, and conducts manipulation such as conversation or start of a battle while changing a viewpoint of the game with the right hand.

The detection unit 105 is, for example, an acceleration sensor or a gyroscope. The detection unit 105 measures to what a degree the mobile terminal 100 is inclined from the vertical direction or the horizontal direction, on the basis of a displacement of a physical quantity (an acceleration or an angular velocity) at the time when the mobile terminal 100 moves. The detection unit 105 detects the orientation of the mobile terminal 100 on the basis of the measured inclination and outputs the orientation to the control unit 103. It is also possible that the detection unit 105 measures only the inclination and the control unit 103 detects the orientation of the mobile terminal 100 on the basis of the inclination measured by the detection unit 105.

The speaker 106 converts an input signal to a voice and outputs the voice. The microphone 107 converts input sound (including a voice) to an electric signal and outputs the electric signal.

The image pickup unit 108 is a solid state image sensor such as, for example, a COMS (Complementary Metal-Oxide Semiconductor) image sensor or a CCD (Charge Coupled Device) image sensor. The image pickup unit 108 converts incident light to an electric signal and outputs the electric signal.

The power supply 109 supplies power to electronic parts housed in the casing 110 (such as, for example, the transmission/reception unit 102, the control unit 103, the storage unit 104, the detection unit 105, the speaker 106, the microphone 107, and the image pickup unit 108).

Figure 4:
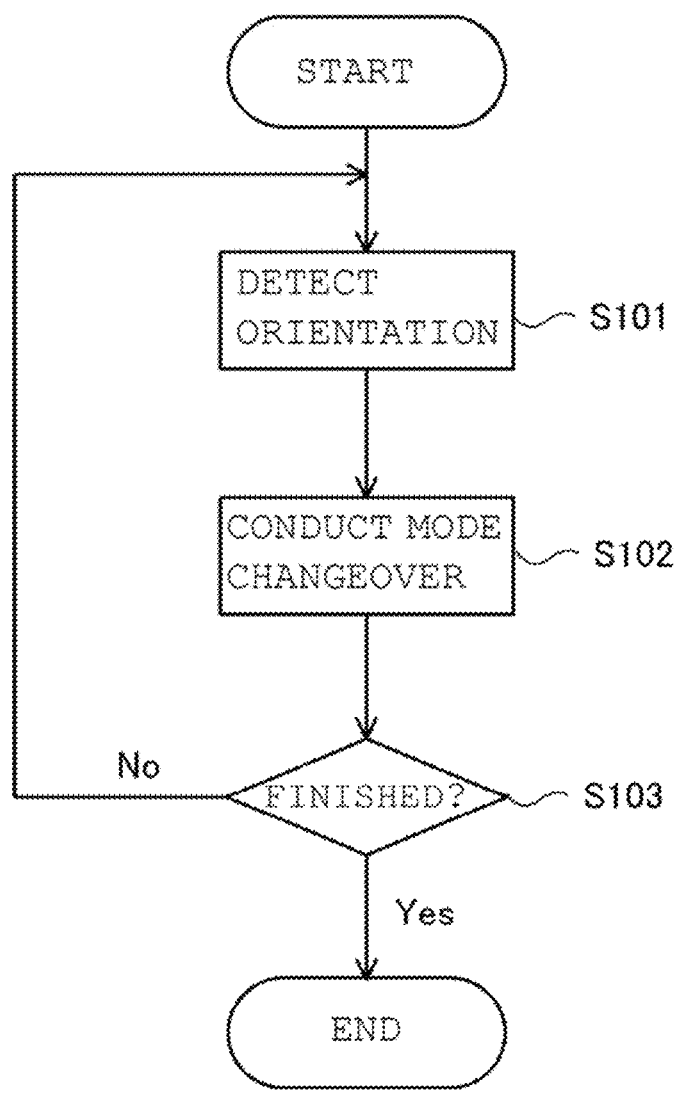
FIG. 4 is a flow chart diagram illustrating an operation of the mobile terminal according to the embodiment.

FIG. 4 is a flow chart diagram illustrating operation of the mobile terminal 100. Hereafter, operation of the mobile terminal 100 will be described with reference to FIGS. 2 to 4.

The detection unit 105 detects whether the mobile terminal 100 is longitudinally oriented or laterally oriented on the basis of an inclination of the mobile terminal 100 (step S101). The control unit 103 changes over between the first manipulation mode and the second manipulation mode depending upon the orientation of the mobile terminal 100 detected by the detection unit 105 (step S102).

Specifically, in a case where the detected orientation of the mobile terminal 100 is longitudinal orientation (the state illustrated in FIG. 3A), the control unit 103 sets the manipulation mode of the mobile terminal 100 to the first manipulation mode. In a case where the detected orientation of the mobile terminal 100 is lateral orientation (the state illustrated in FIG. 3B), the control unit 103 sets the manipulation mode of the mobile terminal 100 to the second manipulation mode.

Then, the control unit 103 determines whether the operation of the mobile terminal 100 has finished (step S103). Unless the operation of the mobile terminal 100 has finished (No in step S103), the control unit 103 returns to the operation in step S101. In a case where the operation of the mobile terminal 100 has finished (Yes in step S103), the control unit 103 finishes the operation.

As described heretofore, the mobile terminal 100 according to the present embodiment detects the orientation of the mobile terminal 100. In the case where the detected orientation of the mobile terminal 100 is longitudinal orientation, the mobile terminal 100 changes over the mode to the first manipulation mode in which the game is caused to manipulated automatically or semi-automatically. In the case where the detected orientation of the mobile terminal 100 is lateral orientation, the mobile terminal 100 changes over the mode to the second manipulation mode in which the game is caused to be manipulated manually. Even in a situation in which one hand cannot be used, therefore, it is possible to enjoy a game, resulting in improved convenience to the user.

Different Embodiment

The mobile terminal 100 described in the above-described embodiment may have a configuration in which a manipulation button is provided to make the function of the detection unit 105 effective. This manipulation button may be provided on the casing 110 in the mobile terminal 100, or may be displayed on the display device 120.

In the different embodiment, the control unit 103 conducts changeover between the first manipulation mode and the second manipulation mode only in a case where the orientation of the mobile terminal 100 is changed while pushing the above-described manipulation button, i.e., in a state in which manipulation that makes the function of the detection unit 105 effective is accepted.

Figure 5:
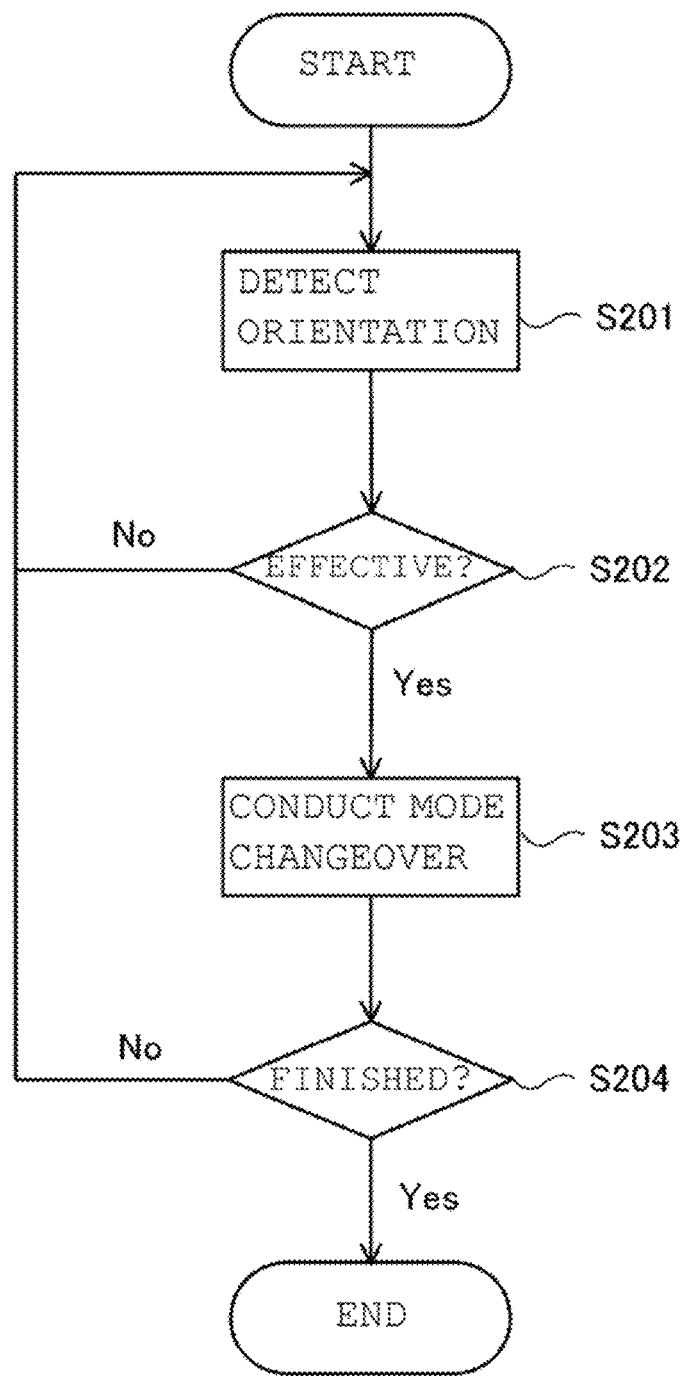
FIG. 5 is a flow chart diagram illustrating an operation of a mobile terminal according to another embodiment.

FIG. 5 is a flow chart diagram illustrating operation of the mobile terminal 100 according to the different embodiment. Hereafter, operation of the mobile terminal 100 according to the different embodiment will be described with reference to FIG. 2, FIGS. 3A and 3B, and FIG. 5.

The detection unit 105 detects whether the mobile terminal 100 is longitudinally oriented or laterally oriented on the basis of inclination or the mobile terminal 100 (step S201). Then, the control unit 103 determines whether a change of the orientation of the mobile terminal 100 is detected in a state in which the manipulation that makes the function of the detection unit 105 is accepted (step S202).

In a case of a state in which the manipulation that makes the function of the detection unit 105 effective is accepted (Yes in step S202), the control unit 103 conducts changeover between the first manipulation mode and the second manipulation mode depending upon the orientation of the mobile terminal 100 detected by the detection unit 105 (step S203). In a case of a state in which the manipulation that makes the function of the detection unit 105 effective is not accepted (No in step S202), the control unit 103 returns to the operation in step S201 without conducting changeover between the first manipulation mode and the second manipulation mode.

Then, the control unit 103 determines whether the operation of the mobile terminal 100 has finished (step S204). Unless the operation of the mobile terminal 100 has finished (No in step S204), the control unit 103 returns to the operation in step S201. In a case where the operation of the mobile terminal 100 has finished (Yes in step S204), the control unit 103 finishes the operation.

As described heretofore, the different embodiment has a configuration in which a manipulation button that makes the function of the detection unit 105 effective is provided. Therefore, the manipulation mode of the mobile terminal 100 can be changed over only in a case where changeover is needed. For example, when the user enjoys a game while lying, the mobile terminal 100 might become longitudinally oriented although manipulation with both hands is possible. In this case, it is possible to prevent the manipulation mode of the mobile terminal 100 from being changed over against the user's will. As a result, convenience to the user is further improved.

REFERENCE SIGNS LIST

100 Mobile terminal
101 Antenna
102 Transmission/reception unit
103 Control unit
104 Storage unit
105 Detection unit
106 Speaker
107 Microphone
108 Image pickup unit
109 Power supply

The invention claimed is:

1. A mobile terminal that provides a real-time gaming environment of a game, the mobile terminal comprising:
   a casing with a longitudinally long rectangular shape;
   a display that is provided on the casing and that displays the game environment;
   a detection unit configured to detect an orientation of the mobile terminal; and
   a processor programmed to: change a manipulation mode of the game based on the orientation of the mobile terminal detected by the detection unit, wherein:
      the detected orientation of the mobile terminal indicates that the mobile terminal is longitudinally oriented or laterally oriented, and
      the changing of the manipulation mode of the game by the processor includes setting the manipulation mode of the game to:
         a first manipulation mode that causes the real-time gaming environment to be manipulated automatically or semi-automatically, when the detected orientation of the mobile terminal indicates that the mobile terminal is longitudinally oriented, and
         a second manipulation mode that causes the real-time gaming environment to be manipulated manually, when the detected orientation of the mobile terminal indicates that the mobile terminal is laterally oriented.

2. The mobile terminal according to claim 1, further comprising a manipulation button that accepts a manipulation conducted by a user to make a function of the detection unit effective.

3. The mobile terminal according to claim 2, wherein the manipulation button is displayed on the display.

4. The mobile terminal according to claim 1, wherein the processor is further configured to: when the first manipulation mode is set as the manipulation mode of the game, and a predetermined situation occurs, automatically perform at least one game operation of the game that is not automatically performed by the processor when the same predetermined situation occurs while the second manipulation mode is set as the manipulation mode of the game.

5. A control method for a mobile terminal that provides a real-time gaming environment of game, the control method comprising:
   detecting an orientation of the mobile terminal; and
   changing a manipulation mode of the game based on the detected orientation of the mobile terminal, wherein
      the detected orientation of the mobile terminal indicates that the mobile terminal is longitudinally oriented or laterally oriented, and
      the step of changing of the manipulation mode includes setting the manipulation mode of the game to:
         a first manipulation mode that causes the real-time gaming environment to be manipulated automatically or semi-automatically, when the detected orientation of the mobile terminal indicates that the mobile terminal is longitudinally oriented, and
         a second manipulation mode that causes the real-time gaming environment to be manipulated manually, when the detected orientation of the mobile terminal indicates that the mobile terminal is laterally oriented.

6. The control method for the mobile terminal according to claim 5, further comprising accepting a manipulation conducted by a user that makes a function of detecting the orientation of the mobile terminal effective, wherein in a case where the manipulation conducted to make the function of detecting the orientation of the mobile terminal effective is accepted, the manipulation mode of the game is changed based on the detected orientation of the mobile terminal.

7. The control method for the mobile terminal according to claim 5, further comprising: when the first manipulation mode is set as the manipulation mode of the game, and a predetermined situation occurs, automatically performing at least one game operation of the game that is not automatically performed when the same predetermined situation occurs while the second manipulation mode is set as the manipulation mode of the game.

8. A non-transitory computer readable medium that stores a program that, when executed by a mobile terminal causes the mobile terminal to:
   detect an orientation of the mobile terminal; and
   change a manipulation mode of a game based on the detected orientation of the mobile terminal, wherein
      the detected orientation of the mobile terminal indicates that the mobile terminal is longitudinally oriented or laterally oriented, and
      the changing of the manipulation mode of the game by the processor includes setting the manipulation mode of the game to:
         a first manipulation mode that causes a real-time gaming environment of the game to be manipulated automatically or semi-automatically, when the detected orientation of the mobile terminal indicates that the mobile terminal is longitudinally oriented, and
         a second manipulation mode that causes the real-time gaming environment to be manipulated manually, when the detected orientation of the mobile terminal indicates that the mobile terminal is laterally oriented.

9. The non-transitory computer readable medium according to claim 8, wherein the program is further configured to, when executed by the mobile terminal, cause the mobile terminal to accept a manipulation conducted by a user to make a function of the detection unit effective.

10. The non-transitory computer readable medium according to claim 8, wherein the program is further configured to, when executed by the mobile terminal, cause the mobile terminal to: when the first manipulation mode is set as the manipulation mode of the game, and a predetermined situation occurs, automatically perform at least one game operation of the game that is not automatically performed when the same predetermined situation occurs while the second manipulation mode is set as the manipulation mode of the game.

* * * * *